US009295137B1

(12) United States Patent
Lunn et al.

(10) Patent No.: US 9,295,137 B1
(45) Date of Patent: Mar. 22, 2016

(54) INTEGRATED LIGHTING LOAD AND SKYLIGHT CONTROL

(71) Applicants: Michael Alan Lunn, Peachtree City, GA (US); Jonathon L. Germon, Peachtree City, GA (US); Kishore S. Aligeti, Peachtree City, GA (US)

(72) Inventors: Michael Alan Lunn, Peachtree City, GA (US); Jonathon L. Germon, Peachtree City, GA (US); Kishore S. Aligeti, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/205,158

(22) Filed: Mar. 11, 2014

Related U.S. Application Data

(60) Provisional application No. 61/780,400, filed on Mar. 13, 2013.

(51) Int. Cl.
*H05B 37/02* (2006.01)
(52) U.S. Cl.
CPC ..................... *H05B 37/02* (2013.01)
(58) Field of Classification Search
CPC ........................................ H05B 37/02
USPC ........... 315/291, 294, 297, 307, 312
See application file for complete search history.

(56) References Cited

U.S. PATENT DOCUMENTS

| 6,307,331 | B1* | 10/2001 | Bonasia | G01J 1/28 315/158 |
| 6,393,608 | B1* | 5/2002 | Pulford | H05B 37/0272 315/DIG. 4 |
| 2005/0110416 | A1* | 5/2005 | Veskovic | E06B 9/32 315/149 |
| 2010/0201267 | A1* | 8/2010 | Bourquin et al. | 315/32 |
| 2012/0153868 | A1* | 6/2012 | Gu et al. | 315/307 |
| 2012/0248987 | A1* | 10/2012 | Zaveruha et al. | 315/129 |

OTHER PUBLICATIONS

Solutube International; Solatube Daylight Dimmer Integration Guide; Jan. 27, 2010.

* cited by examiner

*Primary Examiner* — Tung X Le
(74) *Attorney, Agent, or Firm* — King & Spalding LLP

(57) ABSTRACT

An integrated room controller includes a lighting relay that operates a lighting load based on a lighting relay input signal. Further, the integrated room controller includes a motor control relay that operates a motor associated with an adjustable skylight fixture based on a motor control relay input signal. In addition, the integrated room controller includes a microcontroller that is coupled to the lighting relay and the motor control relay. The microcontroller generates and outputs the lighting relay input signal to the lighting relay and the motor control relay input signal to the motor control relay to control the operation of the lighting load and the adjustable skylight. The integrated room controller also includes a dimmer control circuit coupled to the lighting load and actuated by the microcontroller to control dimming operations associated with the lighting load.

19 Claims, 3 Drawing Sheets

INTEGRATED LIGHTING LOAD AND SKYLIGHT CONTROL

CROSS REFERENCE TO RELATED APPLICATIONS

This application claims priority to U.S. Provisional Patent Application No. 61/780,400 filed Mar. 13, 2013 in the name of Michael Alan Lunn, Jonathon L. Germon, and Kishore S. Aligeti and entitled "Integrated Lighting Load and Skylight Control," the entire contents of which are hereby incorporated herein by reference.

This application is related to U.S. Provisional Patent Application No. 61/780,411 filed Mar. 13, 2013 in the name of Michael Alan Lunn, Jonathon L. Germon, and Kishore S. Aligeti and entitled "Automatic Emergency Lighting Load Control," the entire contents of which are hereby incorporated herein by reference.

TECHNICAL FIELD

This disclosure relates generally to lighting control and, in one example embodiment, to a system, method and an apparatus for integrated lighting load and skylight control.

BACKGROUND

For access to natural light, a room may be installed with adjustable skylight fixtures (herein "an adjustable skylight"). The adjustable skylight may be configured to be opened or closed to vary the amount of natural light made available in the room. For example, a user may close the skylight during presentations to limit natural light in the room and later open the adjustable skylight to allow natural light into the room. The adjustable skylight may be coupled to a motor to control the opening or closing of the adjustable skylight. The end user may control the position of the adjustable skylight using buttons or switches at a user panel that provide input to the motor.

In addition to the adjustable skylight, the room may be installed with lighting fixtures that may have dimming capability to provide artificial lighting to the room. The lighting fixtures may be coupled to a lighting controller that aids a user to switch on, switch off, and/or dim the artificial lighting in the room from a lighting control panel.

Conventional technology may provide two separate sets of controllers to control the operations of the adjustable skylight and the lighting fixtures respectively. In addition, the two separate sets of controllers may not be directly compatible with each other, i.e., additional hardware or circuitry may be needed to couple the two controllers for a unified operation.

Further, even if the two separate sets of controllers are compatible, the two separate sets of controllers may not operate in conjunction with each other. For example, when the adjustable skylight is open and the room is well-lit by the natural light, the artificial lighting may need to be switched off automatically or dimmed to maximize energy conservation and to maintain a preset amount of lighting in the room to a balanced level. Conventional technology may require complex hardware and software installation procedures to synchronize the operation of both the skylight controller and the lighting controller.

The complex installation procedures may require highly skilled technicians and can be cost-intensive and time consuming. Further, having to purchase multiple controller units for different light setting, and additional hardware to integrate them may be cost intensive in terms of material cost. Further, conventional technology may include two separate user control panels, one for controlling the natural light and the other for controlling the artificial light. The two separate user control panels may each have numerous settings which may complicate their use because the end user may have to separately adjust the settings on each control panel and learn the different modes of operation available on each of the control panel. Such complicated use may provide an unpleasant user experience. Thus, there is a need for an integrated lighting load and skylight control technology to overcome the shortcomings of the conventional technology.

SUMMARY

The present disclosure can address the needs described above by an integrated lighting load and skylight controller that controls a lighting load and an adjustable skylight using a single integrated room controller.

In one aspect, an integrated room controller includes a lighting relay that is adapted to be coupled to a lighting load based on a lighting relay input signal. Further, the integrated room controller includes a motor control relay that is adapted to be coupled to a motor associated with an adjustable skylight based on a motor control relay input signal. In addition, the integrated room controller includes a microcontroller coupled to the lighting relay and the motor control relay. The microcontroller generates the lighting relay input signal and the motor control relay input signal based on a user input signal and/or an input signal received from one or more sensors, such as a daylight sensor, an occupancy/vacancy sensor, and so on. Further, the microcontroller outputs the lighting relay input signal to the lighting relay and the motor control relay input signal to the motor control relay to control the operation of the lighting load and the adjustable skylight respectively. The microcontroller controls the operation of the adjustable skylight in conjunction with the operation of the lighting load based on the user input signal or input signals received from the one or more sensors. For example, when a user selects a mode of operation corresponding to a audio/video presentation, the adjustable skylight is closed and artificial light sources may be switched off or dimmed. To control the dimming operation associated with the lighting load, the integrated room controller may include a dimmer control circuit that is coupled to the lighting load.

In another aspect, a system includes an integrated room controller that is adapted to be coupled to a motor associated with an adjustable skylight and a lighting load associated with an artificial light source. The integrated room controller is configured to control an operation of the adjustable skylight in conjunction with the operation of the artificial light source. Further, the system includes one or more sensors coupled to the integrated room controller to provide sensor input signal to the integrated room controller. In addition, the system includes a user input panel coupled to the integrated room controller to provide user input signal to the integrated room controller. The adjustable skylight and the artificial light source is controlled by the integrated room controller based on at least one of the sensor input signal and the user input signal.

In yet another embodiment, a method for integrated control of a lighting load and an adjustable skylight includes receiving a user input signal and/or a sensor input signal at a processor. Further, the method includes generating one or more output signals to control an operation of a lighting load in conjunction with an operation of an adjustable skylight. The one or more output signals are generated by the processor based on the received user input signal and/or the sensor input signal.

These and other aspects, features and embodiments of the disclosure will become apparent to a person of ordinary skill in the art upon consideration of the following detailed description of illustrated embodiments exemplifying the best mode for carrying out the disclosure as presently perceived.

BRIEF DESCRIPTION OF THE DRAWINGS

Embodiments are illustrated by way of example and not limitation in the figures of the accompanying drawings, in which.

Figure 1:
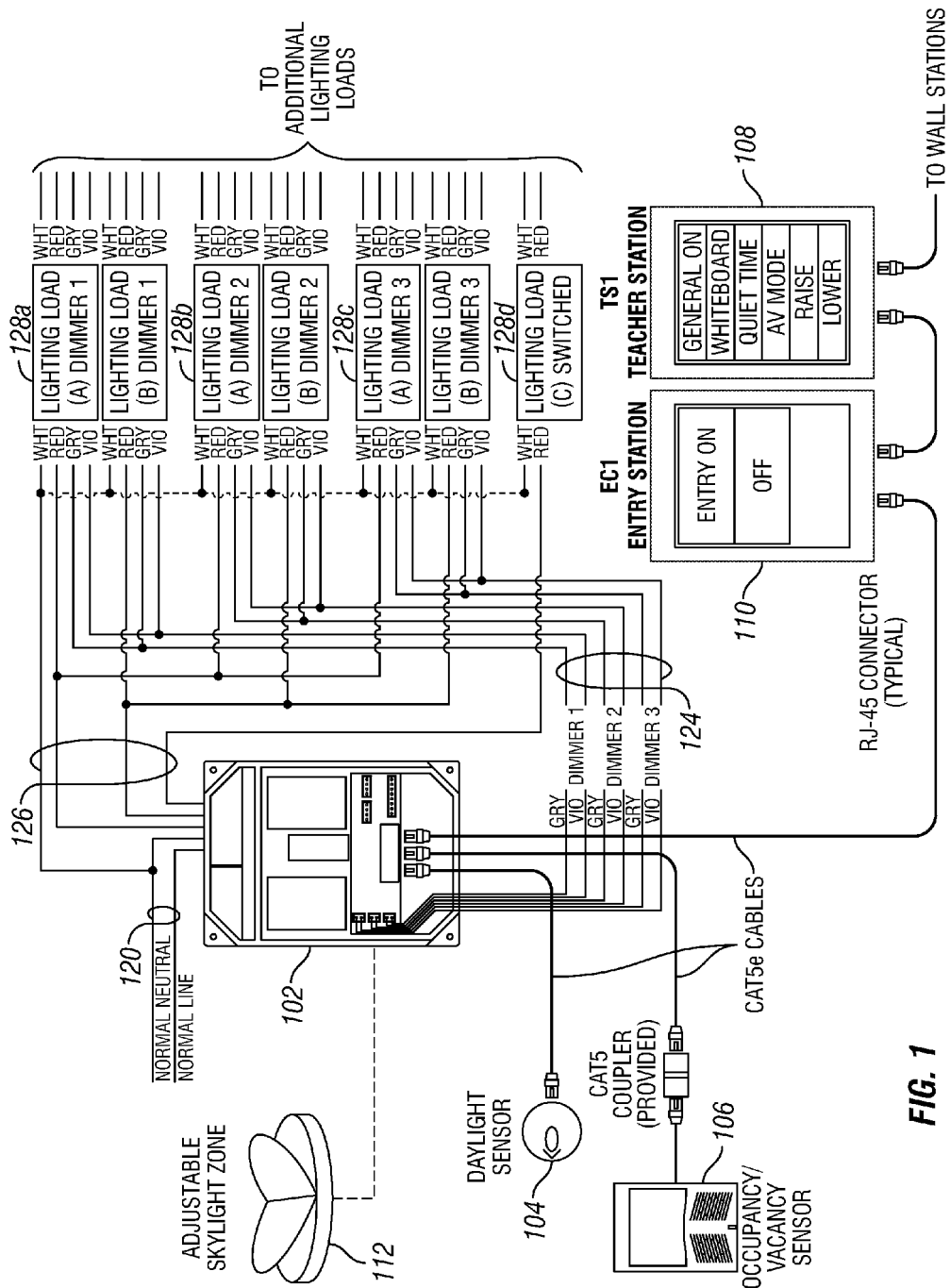
FIG. 1 illustrates a system view of an integrated lighting load and skylight control system, according to certain example embodiments.

Many aspects of the disclosure can be better understood with reference to the above drawings. The elements and features shown in the drawings are not to scale, emphasis instead being placed upon clearly illustrating the principles of the example embodiments. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION OF THE EXAMPLE EMBODIMENTS

Disclosed are a system, a method and an apparatus for integrated lighting load and skylight control. It will be appreciated that the various embodiments discussed herein need not necessarily belong to the same group of example embodiments, and may be grouped into various other embodiments not explicitly disclosed herein. In the following description, for purposes of explanation, numerous specific details are set forth in order to provide a thorough understanding of the various embodiments.

The present disclosure can be embodied in many different forms and should not be construed as limited to the embodiments set forth herein; rather, these embodiments are provided so that this disclosure will be thorough and complete, and will fully convey the scope of the disclosure to those having ordinary skill in the art. Furthermore, all "examples" or "example embodiments" given herein are intended to be non-limiting and among others supported by representations of the present disclosure.

Before discussing the embodiments directed to integrated lighting load and skylight controller, it may assist the reader to understand the various terms used herein by way of a general description of the terms in the following paragraphs.

The term 'adjustable skylight' as used herein may refer to any appropriate light transmitting fenestration that is adjustable to control the amount of light passing through the fenestration.

The term 'relay' as used herein may refer to an electrically operated switch. In one example, a relay may use an electromagnet to mechanically operate a switch. In another example, other operating principles may be used, such as solid-state relay principles. One of ordinary skill in the art can understand and appreciate that relays as described herein can be replaced by any other functionally equivalent switch mechanism without departing from the broader spirit of the disclosure. A 'lighting relay' as used herein may generally refer to any appropriate relay that is associated with the operation of an artificial light source. Further, a 'motor control relay' as used herein may generally refer to any appropriate relay that is associated with the operation of an adjustable skylight.

The term 'lighting load,' as used herein may generally refer to any artificial light source requiring power to operate, including but not limited to light fixtures and lamps.

An integrated lighting load and skylight control system may include an integrated room controller. The integrated room controller may include an electrical connector, for example a terminal block, configured to be directly coupled (electrical coupling) to an adjustable skylight motor for easy installation. One of ordinary skill in the art can understand and appreciate that terminal block, also referred to as terminal board or strip is a representative example of the electrical connector, and may be replaced by any other type of electrical connector such as posts, crimp-on connectors, blade connectors, and so on, without departing from the broader scope of this disclosure.

In addition to being coupled to the adjustable skylight motor, the integrated room controller may be coupled to a user input interface to control both lighting fixtures and the adjustable skylight from a single control station (e.g., wall station control panel). For example, when a user selects an A/V mode or a presentation mode at the user input interface of the integrated room controller, the artificial lighting from the lighting fixtures may dim/switch off and the adjustable skylight may close automatically. Further, when the A/V mode is switched off or changed to another mode of operation, the adjustable skylight may open and the artificial lighting from the lighting fixtures may go to full brightness or dimmed state based on the amount of light in the room. That is, a single integrated room controller can be used to control both the adjustable skylight and the lighting loads coupled to the integrated room controller. Further, the integrated room controller may be pre-programmed to allow an integrated control of both the adjustable skylight and the lighting fixtures that can save additional programming, setup costs, and time.

Technology for integrating control of skylights and artificial lighting will now be described in greater detail with reference to FIGS. 1-3, which describe representative embodiments.

Figure 2A:
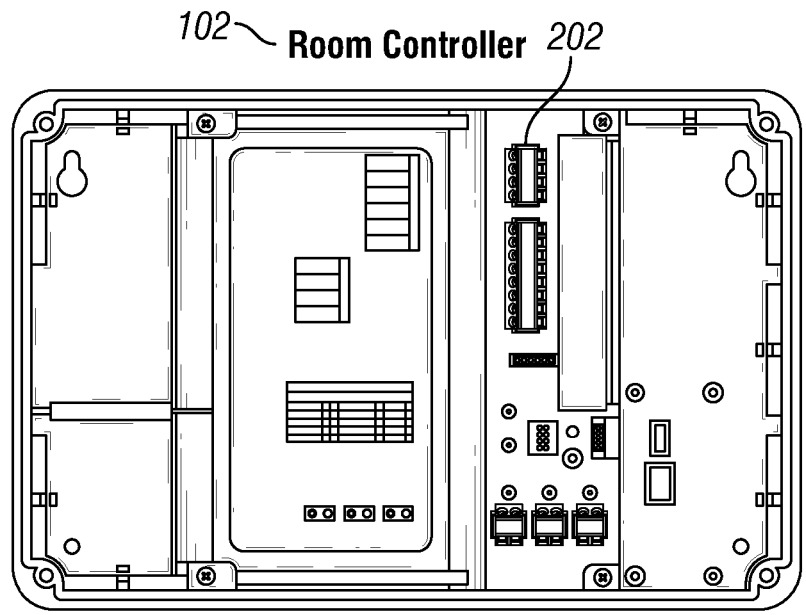
FIGS. 2A and 2B (collectively "FIG. 2") illustrate a coupling of an integrated room controller with an adjustable skylight motor, according to certain example embodiments.
Figure 2B:
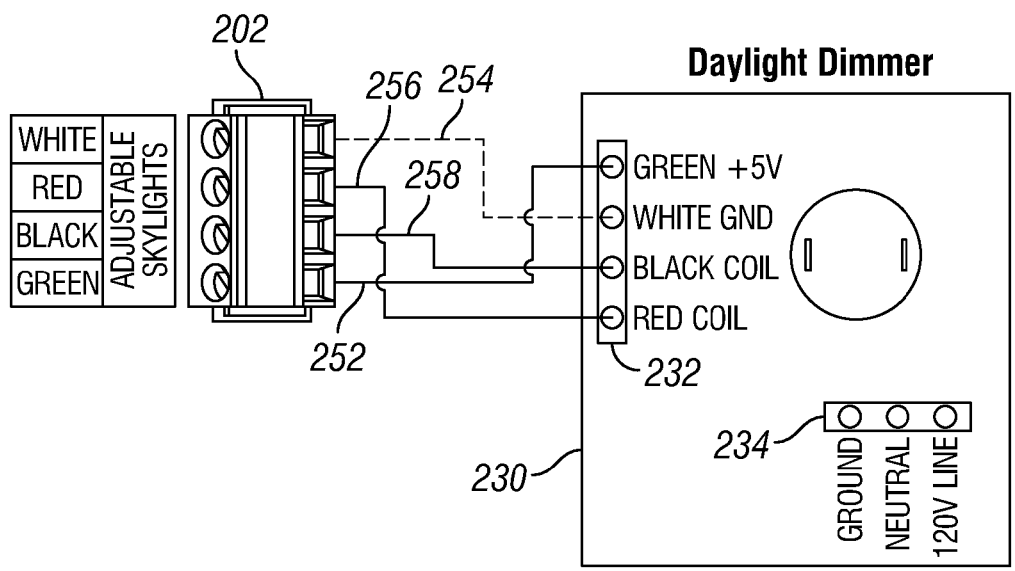

FIG. 1 illustrates a system view of an integrated lighting load and skylight control system, according to certain example embodiments. In particular, FIG. 1 illustrates an integrated room controller 102 (which may also be referred to as "an automatic emergency lighting load controller" or "an emergency controller"), a daylight sensor 104, an occupancy/vacancy sensor 106, a user interface panel 108 and 110, an adjustable skylight 112, utility power supply lines 120, dimmer control signal lines 124, lighting relay output lines 126, and lighting loads 128a, 128b, and 128c.

In an example embodiment, the integrated lighting load and skylight control system may include an occupancy/vacancy sensor 106 (herein 'O/V sensor') coupled to an integrated room controller 102. The O/V sensor 106 may be configured to determine presence or absence of occupants in a monitored space and send corresponding signals to the integrated room controller 102 to take suitable actions. Upon receiving said signal from the O/V sensor 106, the integrated room controller 102 may effect a change in the operation of lighting fixtures and adjustable skylight within the monitored space, provided the lighting fixtures in the monitored space are associated with and controllable by the integrated room controller 102. For example, when there is no person in a room, the ON sensor 106 may determine that the room is vacant and transmit a corresponding signal to the integrated room controller 102. Further, the integrated room controller may dim or switch off the lighting fixtures and close the adjustable skylight in the monitored space for maximum energy saving.

In addition to the ON sensor 106, the integrated lighting load and skylight control system may include a daylight sensor 104. The daylight sensor 104 may be coupled to the integrated room controller 102 and configured to determine the intensity of daylight available in a monitored space. On the basis of the determination, the daylight sensor 104 may send a signal to the integrated room controller 102, responsive to which the integrated room controller 102 may actuate a dimming operation to change the settings of the lighting fixtures in the monitored space. For example, when the daylight sensor 104 determines that the intensity of daylight is high within a monitored space, the daylight sensor 104 may send this information to the integrated room controller 102. Responsive to receiving the information, the integrated room controller 102 may dim the lighting fixtures to 50% intensity (i.e., half brightness).

The change in operation of the lighting fixtures as described herein may generally refer to switching on, switching off, and/or changing an intensity of the light emitted from the lighting fixtures (e.g., dimming). In some embodiments, each lighting fixture may be individually controllable.

In an example embodiment, the sensors (O/V sensor 106 and/or daylight sensor 104) described herein may be coupled to the integrated room controller 102 via a CAT 5 cable. One of ordinary skill in the art can understand and appreciate that the CAT5 cable may be replaced by any other appropriate type of cable capable of carrying data from a sensor to the integrated room controller 102. In some embodiments, the data from the sensor can be transmitted wirelessly.

In addition to the sensors, the integrated lighting load and adjustable skylight control system includes a user interface panel 108 and 110 (herein "UI panel") that is user manipulatable and coupled to the integrated room controller 202. The UI panel 110 may be configured to aid a user to switch on lighting fixtures in a space upon entry into the space and UI panel 108 may be configured to provide additional advanced control options to the user. In some embodiments, the UI panels 108 and 110 may be integrated into one UI panel 110. The UI panel 108 and 110 may be configured to receive user input and transmit the user input to the integrated room controller 102. Responsive to receiving the user input, the integrated room controller 102 may control lighting fixtures and the adjustable skylight associated with the integrated room controller 102.

In an example embodiment, the UI panels 108 and 110 may include a touch screen interface that can receive a tactile input from a user to select various modes of operation of the lighting fixture and adjustable skylight as desired by a user. One of ordinary skill in the art can understand and appreciate that the touch screen may be replaced by any other suitable input interface such as a gesture recognition interface, a switch interface, a button interface, etc. The advanced modes of operation for the lighting fixtures and adjustable skylight available on the UI interface 110 may include, but are not limited to, half-light (where the dimmer is set to 50%, or only half the lights are switched on and an adjustable skylight may be open or closed), full-light (turning on all lights, or switching all lights to full brightness and skylight may be open), undercabinet mode, general on mode, whiteboard mode, quiet time mode, AV mode (where the adjustable skylight may be closed and the lighting fixtures may be dimmed), raise mode (to raise the intensity of the lights (e.g., press and hold or in 5% step increments)), lower mode to lower the intensity of the lights (e.g., in 5% step decrements), and/or all off mode (to switch off all lights, both skylight and lighting loads or actuate test mode).

Further, to control the artificial lighting in a space, the integrated room controller 102 may be coupled to and configured to control one or more lighting loads 128a, 128b, 128c and/or 128d. In some embodiments, the integrated room controller 102 may be coupled to an emergency lighting load (not shown in Figures) that may go to full bright when utility or normal power supply to the integrated room controller 102 is interrupted. Input and output connections to the integrated room controller 102 will be described in greater detail in the following paragraphs.

As described above, the integrated room controller 102 may be configured to receive inputs from the O/V sensor 106, the daylight sensor 104, and the UI panels 108 and 110. Further, the integrated room controller 102 may be configured to receive the utility power supply lines 120 as an input. The utility power supply lines 120 may provide utility power to the integrated room controller 102 for operation of various components within the integrated room controller 102. The various modules and components internal to the integrated room controller 102 and the operation of the integrated room controller 102 will be described in greater detail in association with FIG. 3. In an example embodiment, the utility power supply lines 120 may be a 3-wire, single phase power supply wiring that includes two live wires, each supplying 120V and a third neutral wire. In another example embodiment, the utility power supply lines 120 may be a 4-wire, 3 phase utility power supply wiring which includes 3 live wires, each supplying 120V that are out of phase and a fourth neutral wire. In one embodiment, as illustrated in FIG. 1, a lead may be drawn from the neutral wire of the utility power supply lines 120 and coupled to an input of each of the lighting loads 128a, 128b, 128c, and/or 128d (lighting loads A, B, and/or C) associated with the integrated room controller 102. In some embodiments, in addition to the utility power supply lines 120, the integrated room controller 102 may be adapted to receive emergency power supply lines as an input.

The integrated room controller 102 may be configured to output dimming control signals for each of the lighting loads 128. In some embodiments, the dimming control signals may be generated based on a user input received from the UI panels (108 and/or 110) or sensor inputs received from the sensors (104 and/or 106). The integrated room controller 102 may deliver the dimming control signals to the different lighting loads 128a, 128b, 128c, and/or 128d over one or more dimming control lines 124.

In addition to the dimming control output, the integrated room controller 102 may be configured to output one or more operational voltages that drive the lighting loads, for example lighting load A and lighting load B 128a coupled to dimmer 1. The operational voltage output from the integrated room controller 102 may be delivered to the lighting loads over lighting relay output lines 126 that electrically couple the integrated room controller 102 to the lighting loads (128a, b, c and/or d). Further, the integrated room controller 102 may be configured to output adjustable skylight motor control signals to control the adjustable skylight to operate in conjunction with the lighting loads 128. The operation of the integrated room controller 102 will be described in greater detail below, in association with FIG. 3. Further, the coupling of the integrated room controller 102 to the adjustable skylight motor will be illustrated and described in greater detail below, in association with FIGS. 2A and 2B (collectively "FIG. 2").

FIG. 2 illustrates a coupling of an integrated room controller with an adjustable skylight motor, according to certain example embodiments. In particular, FIG. 2 illustrates the integrated room controller 102, the motor control terminal block 202, the motor control power supply line 252, the motor control power supply return line 254, the motor coil 1 line 256, the motor coil 2 line 258, the motor control panel 230, the motor control connector block 232, and the motor control panel power supply terminal 234.

In one embodiment, the adjustable skylight may include a motor that controls the opening and closing of the adjustable skylight based on the direction in which the motor rotates. The direction of rotation of the motor may be controlled by motor control signals received from the integrated room controller 102. The integrated room controller 102 may generate motor control signals based on a user input signal and a sensor signal received from the user input interface and the sensor, respectively. In other words, the motor of the adjustable skylight 112 may be controlled such that the adjustable skylight 112 operates in conjunction with the lighting load and dimmer control signals. The adjustable skylight may be operated in conjunction with artificial light fixtures associated with the lighting load to control the lighting in a room that is lit using both natural light from the adjustable skylight and artificial light from artificial light sources, such as light fixtures and lamps. The room may be lit by a blend of natural light and artificial light, and the integrated room controller may be programmed to determine the intensity of natural light and the intensity of artificial light that is used to light the room at a given instance. For example, when an AV or presentation mode is selected, the adjustable skylight 112 is closed while the lighting loads 128 are dimmed. In some embodiments, the motor may be controlled to partially open or close the adjustable skylight based on the desired intensity of natural light in a MOM.

The integrated room controller 102 may include a motor control terminal block 202. The motor control terminal block 202 may be configured to receive wire leads to couple the integrated room controller 102 to the motor control panel 230. The other end of the wire leads may be coupled to the motor control connector block 232 on the motor control panel 230. The motor control panel 230 may be external to the integrated room controller 102. Both the motor control connector block 232 on the motor control panel 230, and the motor control terminal block 202 on the integrated room controller 102 may be color coded for easy installation. In an example embodiment, the motor control DC power line 252 may be color coded as green. The motor control DC power return line 254 may be color coded as white and the motor control coil 1 and coil 2 lines 258 and 256 may be colored red and black. Lead wires may be drawn from the motor control terminal block 202 and coupled to the motor control connector block 232. The internal diagram of the integrated room controller 102 and the operation of the integrated room controller 102 may be described in greater detail below, in association with FIG. 3.

Figure 3:
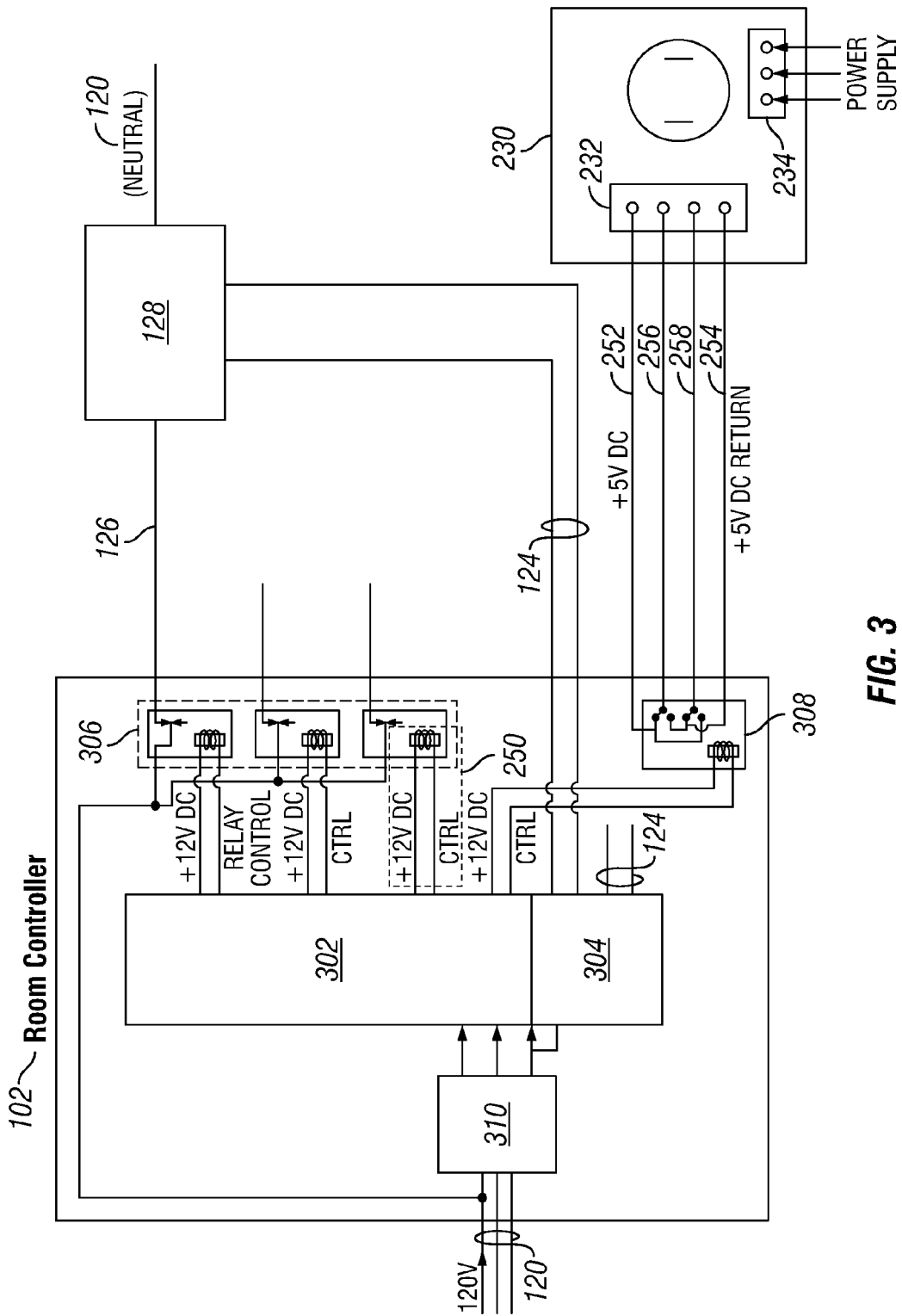
FIG. 3 illustrates an internal view of an integrated room controller of the integrated lighting load and skylight control system, according to certain example embodiments.

FIG. 3 illustrates an internal view of an integrated room controller of the integrated lighting load and skylight control system, according to certain example embodiments of the present disclosure. In particular, FIG. 3 illustrates an integrated room controller 102, a microcontroller 302, a dimmer control circuit 304, an AC to DC converter 310, one or more lighting relay switches 306, a lighting load 128, lighting relay output wire 126, utility power supply lines 120, dimmer control lines 124, a motor control relay switch 308, and motor control relay output signal lines 252-258.

In an example embodiment, as illustrated in FIG. 3, the integrated room controller 102 may include a dimmer control circuit 304 to control dimming operations of any lighting fixtures associated with the integrated room controller 102 (both normal lighting fixtures and emergency lighting fixtures, if any). Further the integrated room controller 102 may include a microcontroller 302 that is coupled to the dimmer control circuit 304. In addition to the dimmer control circuit 304, the microcontroller 302 may also be coupled to the light relay switches 306, and the motor control relay switch 308.

The microcontroller 302 may be configured to control the operation of the lighting relay switches 306 and the motor control relay switch 308, such that lighting load 128 and adjustable skylight 112 may operate in conjunction. In an example embodiment, the microcontroller 302 may be pre-programmed or pre-configured such that the lighting relay switch 306 may be operated in conjunction with the motor control relay switch 308.

In one embodiment, lighting relay switch 306 may be a single pole single throw (SPST) relay switch that is configured to switch on or switch off based on lighting relay control input signals (herein "lighting relay input signals") received from the microcontroller 302. The lighting relay input signals may be generated by the microcontroller 302 based on input signals received at the microcontroller, such as the user input signal received from the user input panel 110/108 and/or sensor input signals received from the daylight sensor 104 and the occupancy/vacancy sensor 106. The lighting relay switch 306 can be switched on and switched off based on the lighting relay input signal generated by the microcontroller 302. When the lighting relay switch 306 is on, the lighting relay switch 306 delivers utility power from the AC mains to the lighting load 128 over the lighting relay output line 126. Alternately, when the lighting relay switch 306 is open (turned off), the lighting load 128 may be disconnected from the utility power, thereby switching off a lighting fixture associated with the lighting load 128.

In one embodiment, the motor control relay switch 308 may be a double pole double throw (DPDT) relay switch that is configured to switch on or switch off based on motor control relay input signals received from the microcontroller 302. The motor control relay input signal may be generated by the microcontroller 302 based on input signals received at the microcontroller, such as the user input signal received from the user input panel 110/108 and/or sensor input signals received from the daylight sensor 104 and the occupancy/vacancy sensor 106. The motor control relay switch 308 can be switched on and switched off based on the lighting relay input signal generated by the microcontroller 302. The operation of the motor control relay switch 308 may be such that when the relay 308 is switched on the motor control coil 1 line 256 is coupled to the motor control DC power line 252, and when the relay is switched off the motor control coil 2 line 258 is coupled to the motor control DC power line 252. In an example embodiment, the motor control DC power line 252 may provide a +5V DC supply for operation of the motor associated with the adjustable skylight 112. On the basis of which coil (coil 1 or coil 2) is coupled to the DC power line 252, the motor may turn in one direction or the other, thereby opening or closing the adjustable skylight 112.

One of ordinary skill in the art can understand and appreciate that even though the lighting relay switch and the motor control relay switch are described herein as formed by an SPST, SPDT, and/or a DPDT switch, any other appropriate relay based or non-relay based switch may be used in the circuit, without departing from the broader spirit of the disclosure.

In addition to the microcontroller 302, the dimmer control circuit 304, the lighting relay control 306, and the motor control relay switch 308, the integrated room controller 102 may include an AC to DC converter coupled to the microcontroller 302 and configured to convert incoming utility AC power to a DC power that is used to drive the operations of the microcontroller 302 and the dimmer control circuit 304.

In an example embodiment, when a user selects the A/V or presentation mode, the user input is transmitted from the user interface panel 108 and/or 110 to the integrated room controller 102. Upon receiving the user input signal corresponding to the A/V mode of operation, the microcontroller 302 of the integrated room controller 102 may actuate the dimming control circuit 304 to output dimming control signals which are then transmitted to the lighting load 128. Accordingly, the lighting fixtures associated with the lighting load 128 may be dimmed. In addition to actuating the dimmer control circuit 304, the microcontroller 302 may actuate the relay control circuit 250 and the motor control relay switch 308, thereby coupling one of the motor control coil lines (e.g., motor control coil 1 line 256, black wire) to the DC supply line 252 to close the adjustable skylight 112.

Later, when the user switches from the A/V mode to select a 'general on' mode, a corresponding user input signal may be transmitted to the integrated room controller 102. Further, the integrated room controller 102 receives input signals from the daylight sensor 104 and the O/V sensor 106. On the basis of the user input signal and the sensor input signals, the microcontroller 302 may actuate the dimming control circuit to output a corresponding dimming control signal to the lighting load 128. On the basis of the dimming control signal, the lighting fixture associated with the lighting load 128 may be changed from a dimmed state to a bright state. In addition to actuating the dimming control circuit 304, the microcontroller 302 may open the relay control circuit 250 and the motor control relay switch 308, thereby coupling the other motor control coil line (e.g., motor control coil 2 line 258, red wire) to the DC supply line 252 to open the adjustable skylight 112.

In summary, the integrated room controller 102 provides a single control unit for controlling both the adjustable skylight 112 and the lighting load 128, thereby reducing installation complexities and additional hardware/wiring costs. The integrated room controller 102 may include a pre-programmed or pre-configured microcontroller 302 that is configured to generate signals to control both the adjustable skylight 112 and the lighting load 128 based on user input signals and sensor signals. For example, in an AV mode of operation selected by an end user, the integrated room controller 102 may be configured to automatically close the adjustable skylight 112 limiting natural light in a space, and dim the lighting zones to a desired level of dimming. In one example embodiment, the integrated room controller 102 may include a memory (transitory or non-transitory) unit that may comprise a set of instructions. Further, the integrated room controller 102 may include a processor configured to execute the set of instruction to perform operations of the integrated room controller 102 as described herein. In another example, the processor and the memory may be included in the microcontroller. Further, the microcontroller may have programmable input/output peripherals for entering the set of instructions.

As an example, the set of instructions stored in memory in the integrated room controller 102 can cause the adjustable skylight 112 into the following states based on the indicated input:

TABLE 1

Position of the adjustable skylight for each mode of operation
Automatic Software Flow Control of Skylight Motor

| Input | Skylight State |
|---|---|
| Occupancy Detection - person walks in the space | Open |
| Vacancy Detection - space is empty | Closed |
| A/V Mode button press - enter A/V Mode | Closed |
| A/V Mode button press - leave A/V Mode | Open |
| Time Clock Afterhours mode | Closed |
| Entry button pressed | Open |

Thus, the integrated room controller 102 can be used to control the adjustable skylight 112 without requiring additional wiring, commissioning or programming beyond that described herein. In addition to user input signals and the sensor input signals, in one example embodiment, the microcontroller 302 may be configured to generate the motor control relay input signal and the lighting relay input signal based on the state defined in the above-mentioned table.

From the description of the example embodiments, equivalents of the elements shown therein will suggest themselves to those skilled in the art, and ways of constructing other embodiments of the present disclosure will appear to practitioners of the art. Therefore, the scope of the present disclosure is to be limited only by the claims that follow. Further, the specification and drawings are to be regarded in an illustrative rather than a restrictive sense.

What is claimed is:

1. An integrated room controller, comprising:
   a lighting relay that is adapted to be coupled to a lighting load based on a lighting relay input signal;
   a motor control relay that is adapted to be coupled to a motor associated with an adjustable skylight based on a motor control relay input signal;
   a microcontroller coupled to the lighting relay and the motor control relay and configured to output the lighting relay input signal to the lighting relay and the motor control relay input signal to the motor control relay to control the lighting load and the adjustable skylight respectively; and
   a dimmer control circuit coupled to the lighting load and configured to control dimming operations associated with the lighting load.

2. The integrated room controller of claim 1, wherein the microcontroller is configured to control the lighting relay in conjunction with the motor control relay based on at least one of a user input signal and a sensor input signal.

3. The integrated room controller of claim 2, wherein the lighting relay input signal and the motor control relay input signal are generated by the microcontroller based on at least one of the user input signal and the sensor input signal.

4. The integrated room controller of claim 2, wherein the user input signal is received from a user interface panel coupled to the integrated room controller and configured to receive a user input.

5. The integrated room controller of claim 2, wherein the sensor input signal is received from an occupancy/vacancy sensor.

6. The integrated room controller of claim 2, wherein the sensor input signal is received from a daylight sensor.

7. The integrated room controller of claim 2, wherein when the user input signal corresponds to a presentation mode of operation, the integrated room controller is configured to close the adjustable skylight and change an operation of a lighting fixture associated with the lighting load to a dim mode.

8. The integrated room controller of claim 1, wherein the microcontroller is configured to actuate the dimming control circuit to generate a dimming control signal for the dimming operations associated with the lighting load.

9. A system comprising:
an integrated room controller adapted to be coupled to:
a motor associated with an adjustable skylight, and
a lighting load associated with an artificial light source,
wherein the integrated room controller is configured to operate the adjustable skylight in conjunction with the artificial light source;
one or more sensors coupled to the integrated room controller to provide a sensor input signal to the integrated room controller; and
a user input panel coupled to the integrated room controller to provide a user input signal to the integrated room controller,
wherein the adjustable skylight and the artificial light source are controlled by the integrated room controller based on at least one of the sensor input signal and the user input signal.

10. The system of claim 9, wherein the user input panel provides one or more control options to a user to adjust an intensity of natural light received via the adjustable skylight and an intensity of artificial light received via the artificial light source.

11. The system of claim 10, wherein the intensity of the artificial light is reduced based on a dimming control signal generated by the integrated room controller, and wherein the dimming control signal is generated based on at least one of the user input signal and the sensor input signal.

12. The system of claim 9, wherein the integrated room controller is configured to open and close the adjustable skylight.

13. The system of claim 9, further comprising an emergency lighting load coupled to the integrated room controller and configured to switch on when a power supply to the integrated room controller is interrupted.

14. A method comprising:
receiving, by a processor, at least one of a user input signal and a sensor input signal; and
based on at least one of the user input signal and the sensor input signal, generating, by the processor, one or more output signals to control an operation of a lighting load in conjunction with an operation of an adjustable skylight, wherein the one or more output signals comprise a motor control relay input signal configured to drive a motor control relay coupled to the adjustable skylight.

15. The method of claim 14, wherein the one or more output signals comprise a lighting relay input signal configured to drive a lighting relay coupled to the lighting load.

16. The method of claim 14, further comprising actuating, by the processor, a dimming control circuit configured to generate a dimming control signal for changing an intensity of light generated by an artificial light source associated with the lighting load.

17. The method of claim 14, further comprising activating an emergency lighting load when a power supply to the processor is interrupted.

18. The method of claim 14, wherein the user input signal is received from a user input panel that is configured to present one or more modes of operation to a user, and wherein the user input signal comprises a selection from the one or more modes of operation by the user.

19. The method of claim 14, wherein the sensor input signal is received from at least one of a daylight sensor and an occupancy/vacancy sensor.

* * * * *